M. W. FAHERTY.
STEAM COOKER AND THE LIKE.
APPLICATION FILED APR. 2, 1913.
1,112,127.
Patented Sept. 29, 1914.
3 SHEETS—SHEET 1.
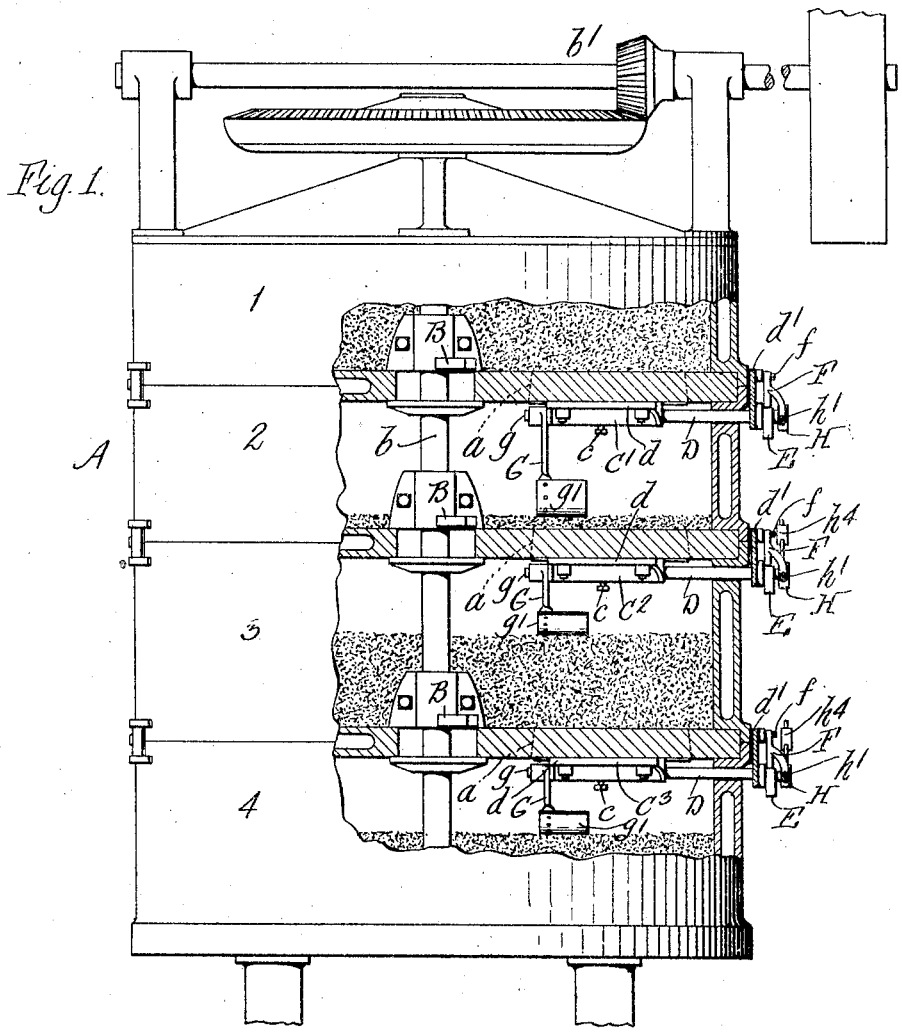
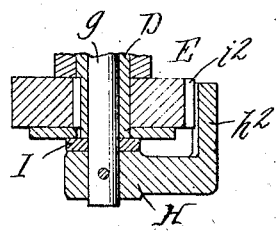
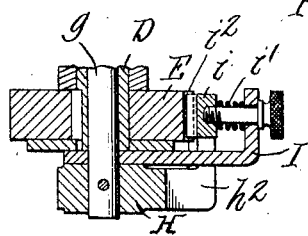
Witnesses
A. F. Dimond
A. Birkenhaan
Inventor
M. W. Faherty
by Wilhelm Parker & Baird
Attorneys

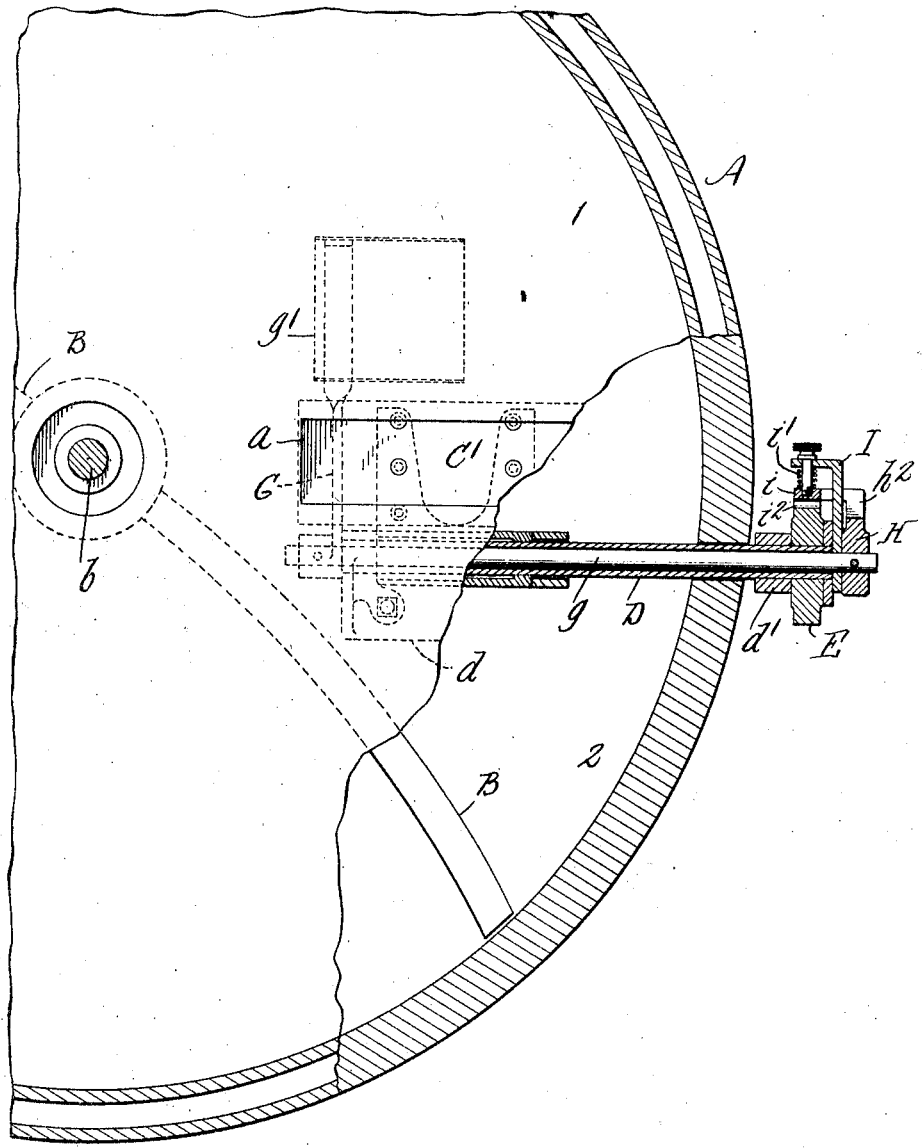

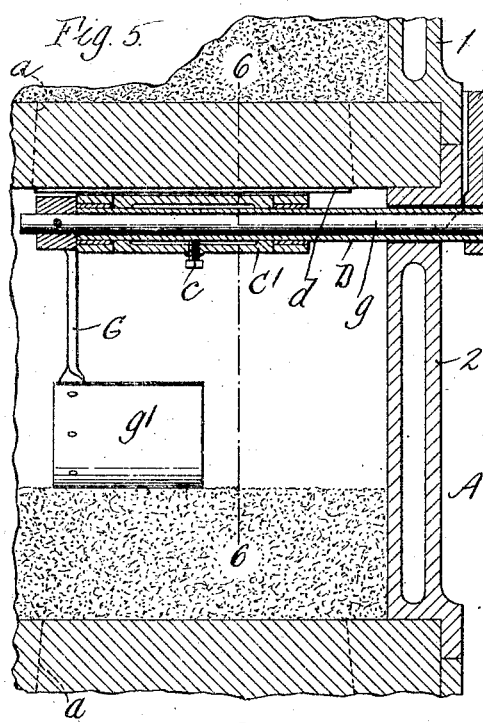
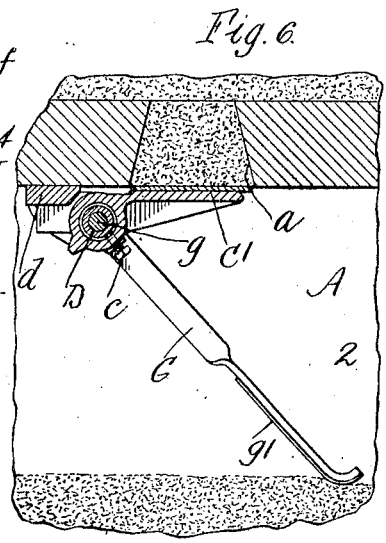
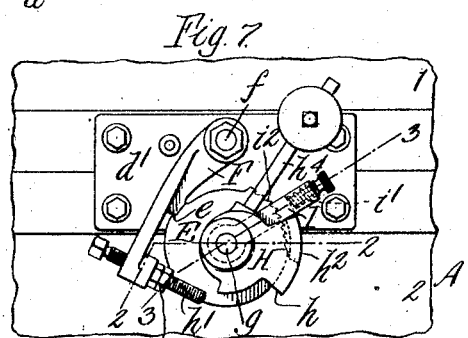
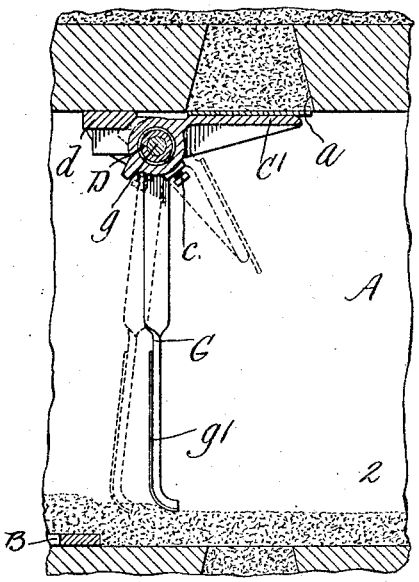
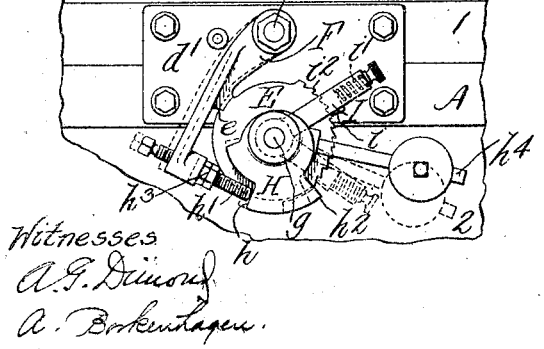

UNITED STATES PATENT OFFICE.

MICHAEL W. FAHERTY, OF MEMPHIS, TENNESSEE, ASSIGNOR TO ALFRED W. FRENCH, OF PIQUA, OHIO.

STEAM-COOKER AND THE LIKE.

1,112,127. Specification of Letters Patent. Patented Sept. 29, 1914.

Application filed April 2, 1913. Serial No. 758,340.

*To all whom it may concern:*

Be it known that I, MICHAEL W. FAHERTY, a citizen of the United States, residing at Memphis, in the county of Shelby and State of Tennessee, have invented a new and useful Improvement in Steam-Cookers and the like, of which the following is a specification.

This invention relates more particularly to improvements in steam cookers or kettles such as used in oil mills for cooking the oilbearing meal or material preparatory to expressing the oil therefrom, and has especial reference to automatic cookers of the kind disclosed in Patent No. 1,015,013, granted Jan. 16, 1912, to Alfred W. French. In said patented cooker a plurality of heating kettles are arranged in a descending series, so that the material can discharge by gravity from one kettle to the next, and are provided with gates which are automatically controlled by the depth of the material in the kettles for regulating the delivery of the material from kettle to kettle, the operation of the gate for each kettle being controlled by the level of the material in the next lower kettle. When the material accumulates to a predetermined depth in such lower kettle it closes the gate of the next kettle above by the lifting action of the material against the gate which rides or floats on the material, and the gate is retained closed by a latch until when a predetermined quantity of material has been withdrawn from the lower kettle, said latch is released by a device which floats on the material and allows the gate to open and deliver material to the lower kettle until sufficient material accumulates therein to again close the gate and prevent further discharge of the material from the upper kettle. In this way the material is retained in each kettle for a substantially definite period of time depending upon the rate at which the material is drawn from the bottom kettle in making the cakes for the press.

It is desirable in the operation of these cookers to vary the length of time that the material remains in each kettle to suit varying conditions of the material, and also in accordance with changing conditions in the mill. For example, if the material is wet it should remain in the cooker for a longer period of time than if it is dry. Since the material is drawn from the bottom kettle for forming the cakes in equal measured quantities at all times, it follows that the length of time it will remain in the cooker and the extent to which it is cooked will depend upon the depth of the material in the kettles, and can be controlled by regulating the depth of the material in the kettles.

The object of this invention is to provide simple and practical means whereby the gate controlling means can be readily adjusted, without the necessity of entering the cooker, so as to regulate the depth of the material in the kettles and the length of time it remains in the kettles to suit changing conditions.

In the accompanying drawings:—Figure 1 is a fragmentary elevation, partly in section, of an automatic steam cooker embodying the invention. Figs. 2 and 3 are sections on an enlarged scale in lines 2—2 and 3—3, respectively, Fig. 7, of the gate controlling mechanism. Fig. 4 is a fragmentary horizontal section on an enlarged scale of the cooker showing one of the gates and its controlling mechanism in plan. Fig. 5 is an enlarged fragmentary sectional elevation of the cooker and the controlling mechanism for one of the gates, showing the position of the parts when the gate is closed. Fig. 6 is a section thereof in line 6—6, Fig. 5. Fig. 7 is an end elevation of the gate locking and releasing mechanism, the parts occupying the same position as in Fig. 5. Fig. 8 is a similar view thereof, showing by solid lines the position of the parts just prior to releasing the gate, and by broken lines the position thereof when the gate is open. Fig. 9 is a sectional elevation, similar to Fig. 6, showing by solid and broken lines the two positions of the float corresponding to the positions of the locking mechanism shown in Fig. 8.

Like reference characters refer to like parts in the several figures.

A represents the cooker which comprises a series of heating kettles or chambers 1, 2, 3, 4, arranged in a descending series, or one below the other, so that the meal can discharge by gravity through the discharge opening *a* in the bottom of one kettle into the next lower kettle. In the cooker shown in Fig. 1, four kettles are employed, arranged one directly over and upon the other, but the invention is not limited to this arrangement of the kettles, and they can be arranged in other ways, so that the meal can discharge from one kettle to another. The cooker may also comprise any suitable number of kettles, which may be of any usual or suitable construction. The kettles shown are provided with hollow bottoms and side walls, forming steam chambers, which are supplied with steam in the usual way for cooking or heating the meal.

B represents the usual rotary stirrers or scrapers consisting of arms projecting laterally in the lower portions of the kettles from a vertical central shaft $b$ which is driven by any suitable mechanism $b'$. These stirrers B are suitably shaped to mix or stir the material and cause it to circulate in the kettles. The rotating stirrers produce a sort of wave in the material which travels with the stirrers and is utilized in closing the gates as hereinafter explained.

$C'$, $C^2$, $C^3$ represent the gates for the bottom discharge openings $a$ of the kettles, each kettle except the last or bottom kettle being provided with one of these gates. The bottom kettle has the usual discharge opening (not shown) from which the material is drawn at intervals in measured quantities for forming the cakes for the press. The gate for each kettle is arranged on the under side thereof and is adapted to swing or open downwardly by gravity into the next lower kettle for discharging the material into the latter kettle from the kettle above, controlled by the gate. As shown in the drawings the gate, which may be of any suitable construction, is secured by a set screw $c$, or otherwise, to a hollow hinge shaft or tube D which is adapted to turn in bearings on a plate $d$ secured to the underside of the kettle and extends to the outside of the cooker through a hole in the side wall thereof. $d'$ is a bearing plate secured exteriorly on the cooker for the outer end of the hinge tube D. Secured to the hinge tube D outside of the kettle is a latch disk E provided with a tooth or shoulder $e$ adapted to engage by a latch or dog F for holding the gate closed. A pivoted latch is shown which is pivoted at $f$ on the bearing plate $d'$ adjacent to the disk and is adapted to swing by gravity into holding engagement with the disk. The disk E, being fixed to the hinge tube, turns with the gate, and the latch does not interfere with the closing of the gate, but when the gate is closed, the latch F will engage the tooth of the disk E, as shown in Fig. 7, and prevent the return movement of the disk, thereby locking the gate in the closed position. A latch or locking device of any other suitable construction adapted to allow the closing of the gate and to retain it closed until the latch is released, as hereinafter explained, could be employed.

G represents a gate controlling arm or float which is secured to the inner end of a rock shaft $g$ that extends out of the cooker and has fixed to its outer end, adjacent to the latch F, a plate or part H which is adapted to actuate the latch F for releasing the gate. The shaft $g$ preferably extends through the hinge tube D which forms a bearing therefor. The arm or float G is preferably provided at its free end with a broad plate $g'$ which is adapted to ride or float on the material in the kettle in which the float is located so that the float swings upwardly or downwardly accordingly as the depth of the material in the kettle increases or decreases. When the material has been reduced to a predetermined depth in the kettle the float-actuated plate or part H will release the latch F, thus allowing the gate to open and discharge material from the upper kettle into the lower one.

The apparatus as thus far described is substantially similar to said patented construction. In the latter the gate rides or floats on the material and is raised by the lifting action of the material on the gate itself, being closed when the material reaches a predetermined depth, whereas in the apparatus of this application the float G operates to close the gate as well as to release the latch F for opening the gate. For this purpose, in the construction shown in the drawing, the plate or part H is provided with a face or portion $h$ adapted to strike an adjustable screw $h'$ secured to the latch F for disengaging the latch from the latch disk E to release the gate, and with a lug $h^2$ which projects laterally toward the latch disk E and is adapted to engage an abutment or member I adjustably secured to the latch disk for turning the latter and the hinge tube D to which it is secured to close the gate. By adjusting the screw $h'$ the position to which the float must descend to release the gate can be regulated as required.

$h^3$ indicates nuts for locking the screw when adjusted. The plate or part H is also preferably provided with a weighted arm $h^4$ which tends to swing the shaft $g$ and the attached float G in the direction to release the latch F. The abutment I shown is arranged to turn on the shaft $g$ between the latch disk E and the plate H and is provided at its outer end with a toothed pawl or block $i$ which is held by a spring $i'$ in engagement with teeth $i^2$ on the periphery of the latch disk. This construction enables the abutment to be adjusted circumferentially of the disk E and secured in different positions nearer to or farther from the lug $h^2$ of the plate H. As the material accumulates in the kettle in which the float is located and the level of the material rises, the float G riding on the material will be raised and turn the shaft $g$ and the plate H attached thereto, and when the lug $h^2$ engages the abutment I the latter and the disk E to which it is secured will be turned and close the gate. Since by adjusting the abutment I toward or from the lug $h^2$, the latter can be caused to engage the abutment when the float has been raised to a less or greater extent, the depth to which the material is permitted to rise in the kettle can be regulated as required by the simple adjustment of the abutment I. This adjustable device for controlling the depth of the material in the kettle is located exteriorly of the cooker and can be quickly and easily adjusted whenever it may become necessary, by reason of changing conditions, to change the depth of the material in the kettle, and it is not necessary to enter the cooker or to have access to the internal mechanism to secure this result. It is also possible by means of the controlling mechanism described to individually regulate the action of the several gates, so as to obtain the same depth of material in the several kettles or different depths in different kettles.

The operation of the cooker, assuming the kettles to contain the desired maximum amount of material and the several gates to be held in the closed position by their latches, is as follows:—The material is drawn from the bottom kettle 4 in quantities suitable for making the cakes and when the bottom kettle has been emptied sufficiently for the float G therein to descend far enough to release the latch F for the gate $C^3$ of the next kettle 3, this gate will open and discharge material from the kettle 3 into the bottom kettle and the material accumulating in the bottom kettle will lift the float G until the gate $C^3$ is closed by the engagement of the plate H on the float rock shaft with the abutment I which is connected to the hinge tube D of the gate, and is locked by its latch F, as above explained. The discharge of the material from the kettle 3 reduces the depth of the material therein until the float G in this kettle descends far enough to release the latch of the gate $C^2$ for kettle No. 2 and permits this gate to open and discharge material from kettle No. 2 into kettle No. 3. This gate is closed again by the material accumulating in kettle No. 3 and operating the float in this kettle as in the case of the bottom kettle. In this way the material is discharged from each kettle when the depth of the material in the kettle next below is reduced a predetermined amount and the discharge is stopped when the material accumulates to a predetermined desired depth in such lower kettles.

By proportioning and adjusting the float G, so that it can swing downwardly to substantially vertical position, as shown by full lines in Fig. 9 before tripping the latch, the float will be free to swing over the surface of the material to the position shown by broken lines in said Fig. 9 and will be swung quickly to this position by a weighted arm $h^4$ thereby insuring a quick and positive releasing of the latch F. It is not, however, necessary for the float to swing down to the vertical position to release the latch, and the screw on the latch will be released and the gate opened when the material has been reduced to a greater or less desired extent.

I claim as my invention:

1. The combination with a plurality of kettles or chambers arranged to permit material to discharge from one chamber into another, of a gate which controls the discharge of the material from the first chamber into the second chamber, a device controlled by the depth of the material in the second chamber for closing said gate, and means for holding said gate closed which are actuated by said device to release said gate when the depth of the material in said second chamber is reduced a predetermined amount, substantially as set forth.

2. The combination with a plurality of kettles or chambers arranged to permit material to discharge from one chamber into another, of a gate which controls the discharge of the material from the first chamber into the second chamber, a device which is caused to move independently of said gate by changes in the depth of the material in said second chamber, means actuated by said device for closing said gate, and means for holding said gate closed which are actuated by said device to release said gate when the depth of the material in said second chamber is reduced a predetermined amount, substantially as set forth.

3. The combination with a plurality of kettles or chambers arranged to permit material to discharge from one chamber into another, of a gate which controls the discharge of the material from the first chamber into the second chamber, a device which is caused to move independently of said gate by changes in the depth of the material in said second chamber, means actuated by said device for closing said gate when the material has accumulated to a predetermined depth in said second chamber, and a latch for holding said gate closed which is actuated by said device to release said gate when the depth of the material in said second chamber is reduced a predetermined amount, substantially as set forth.

4. The combination with a plurality of kettles or chambers arranged to permit material to discharge from one chamber into another, of a gate which controls the discharge of the material from the first chamber into the second chamber, a device which is caused to move independently of said gate by changes in the depth of the material in said second chamber, means which are actuated by said device for closing said gate and which are adjustable for causing said gate to be closed when the material has accumulated to different desired depths in said second chamber, and means for holding said gate closed which are actuated by said device to release said gate when the depth of the material in said second chamber is reduced a predetermined amount, substantially as set forth.

5. The combination with a plurality of kettles or chambers arranged to permit material to discharge from one chamber into another, of a gate which controls the discharge of the material from the first chamber into the second chamber, and mechanism controlled by the depth of the material in said second chamber for closing and locking said gate when the material accumulates to a desired depth in said second chamber and for releasing said gate when the depth of the material in said second chamber is reduced a desired amount, said mechanism including a part which is adjustable to regulate the closing of said gate, substantially as set forth.

6. The combination with a plurality of kettles or chambers arranged to permit material to discharge from one chamber into another, of a gate which controls the discharge of the material from the first chamber into the second chamber, and mechanism controlled by the depth of the material in said second chamber for closing and locking said gate when the material accumulates to a desired depth in said second chamber and for releasing said gate when the depth of the material in said second chamber is reduced a desired amount, said mechanism being adjustable to regulate at will both the opening and the closing of said gate, substantially as set forth.

7. The combination with a plurality of kettles or chambers arranged to permit material to discharge from one chamber into another, of a gate which controls the discharge of the material from the first chamber into the second chamber, and mechanism controlled by the depth of the material in said second chamber for closing and locking said gate when the material accumulates to a desired depth in said second chamber and for releasing said gate when the depth of the material in said second chamber is reduced a desired amount, said mechanism including a part located exteriorly of said chambers which is adjustable to regulate the closing of said gate, substantially as set forth.

8. The combination with a plurality of kettles or chambers for solid material arranged to permit the material to discharge from one chamber into another, a gate for controlling the discharge of the material from the first chamber into the second chamber, means for causing the material to circulate in said chambers, and a device movable independently of said gate which is adapted to float on the material in said second chamber for closing said gate when the material accumulates to a desired depth in said second chamber, substantially as set forth.

9. The combination with a plurality of kettles or chambers for solid material arranged to permit the material to discharge from one chamber into another, a gate for controlling the discharge of the material from the first chamber into the second chamber, means for causing the material to circulate in said chambers, and a device movable independently of said gate which is adapted to float on the material in said second chamber, and mechanism controlled by said device for closing and locking said gate when the material accumulates to a desired depth in said second chamber, and for releasing said gate when the depth of the material in said second chamber is reduced a desired amount, substantially as set forth.

10. The combination with a plurality of kettles or chambers for solid material arranged to permit the material to discharge from one chamber into another, a gate for controlling the discharge of the material from the first chamber into the second chamber, means for causing the material to circulate in said chambers, a device adapted to float on the material in said second chamber, and means controlled by said device for closing said gate when the material accumulates to a desired depth in said second chamber for allowing said gate to open when the depth of the material in said second chamber is reduced a desired amount, substantially as set forth.

11. The combination with a plurality of kettles or chambers arranged to permit material to discharge from one chamber into another, of a gate which controls the discharge of the material from the first chamber into the second chamber, a device adapted to float on the material in said second chamber, a latch for holding said gate closed, a rock shaft to which said device is secured and which extends to the exterior of said chambers and is provided with a part adapted to actuate said latch to release said gate, and a part connected to said gate which is adapted to be engaged by said part on said rock shaft for closing said gate, substantially as set forth.

12. The combination with a plurality of kettles or chambers arranged to permit material to discharge from one chamber into another, of a gate which controls the discharge of the material from the first chamber into the second chamber, a device adapted to float on the material in said second chamber, a latch for holding said gate closed, a rock shaft to which said device is secured and which extends to the exterior of said chambers and is provided with a part adapted to actuate said latch to release said gate, and a part connected to said gate which is adapted to be engaged by said part on said rock shaft for closing said gate, said part connected to said gate being located exteriorly of said chambers and being adjustable to regulate the closing of said gate, substantially as set forth.

Witness my hand, this 22nd day of March, 1913.

MICHAEL W. FAHERTY.

Witnesses:
  LILLIAN M. LEE,
  FRANK BLOMBERG.